United States Patent [19]

Skinner, Jr.

[11] Patent Number: 4,531,201
[45] Date of Patent: Jul. 23, 1985

[54] TEXT COMPARATOR

[76] Inventor: James T. Skinner, Jr., 780 Yale Rd., Boulder, Colo. 80303

[21] Appl. No.: 342,620

[22] Filed: Jan. 25, 1982

[51] Int. Cl.³ .............................................. G06F 7/04
[52] U.S. Cl. .................................................. 364/900
[58] Field of Search ... 364/200 MS File, 900 MS File; 365/78

[56] References Cited

U.S. PATENT DOCUMENTS

| Re. 26,919 | 6/1970 | Hagelbarger et al. | 364/900 |
|---|---|---|---|
| 3,763,480 | 10/1973 | Weimer | 365/78 |
| 4,152,762 | 5/1979 | Bird et al. | 364/200 |
| 4,242,735 | 12/1980 | Sexton | 364/900 |
| 4,388,698 | 6/1983 | Allen | 365/78 |

Primary Examiner—Harvey E. Springborn
Attorney, Agent, or Firm—Alan H. MacPherson; Steven F. Caserza; Richard Franklin

[57] ABSTRACT

A text comparator which includes a decoded data memory (13) which contains a plurality of shift registers (SR2∅-SR7F), one shift register for each one of the plurality of different symbols forming the data base stored within the mass storage device (11). The decoded signal is applied to the input lead of the shift register associated with that character, and a clock signal applied to each shift register of the decoded data memory. In this manner, the decoded data memory will provide signals on the output leads of each shift register indicative of the most recently received character, as well as each of the preceding K characters received from the mass storage device and decoded, where K is the number of bits contained in each shift register of the decoded data memory. The output lead of the shift registers are connected to the input leads of a variety of logical gates, such as AND gates and OR gates, in order to provide an output signal indicating when the desired textual phrase has been located on the disk. In addition, word counters, paragraph counters, and other devices are employed as desired to provide special text comparison functions.

14 Claims, 15 Drawing Figures

TEXT COMPARATOR

BACKGROUND OF THE INVENTION

1. Field of the Invention

This invention relates to a structure and method for searching computer data bases in order to locate and retrieve textual information.

2. Description of the Prior Art

Prior art text comparators for searching a computer data base are known. Structures for carrying out such techniques (such structures are herein called "textual comparison systems") are used, for example, by Lockheed Dialog Information Retrieval Service, the United States Government "Flite" service, "Lexis", and others.

Such prior art textual comparison systems are software oriented in that a portion of the information stored in the computer (called a "data base") must be loaded into the computer working memory from a mass memory storage device (typically a magnetic disk). The portion of the data base within the working memory of the computer is scanned by the computer, as controlled by software instructions, in order to determine if any portion of the data base stored in the computer working memory matches the desired text. Typically the textual material comprising the data base is stored by using a set of standard data base characters such as the well-known and commonly used American National Standard Code for Information Interchange ("ASCII"). The ASCII characters and their binary and hexidecimal representations are shown in Table 1. Thus, such prior art software-oriented text comparators are rather slow in that the computer must control the transfer of sequential portions of the data base from a large storage media, such as a disk, to the computer memory, and the computer must then utilize an iterative process in order to determine whether the desired text is contained within that portion of the data base which has been transferred to the computer memory. Because the computer itself is performing the search, such prior art searching techniques are rather slow, and consequently expensive due to the large amount of computer time required to perform a search.

Another prior art comparator system is described in U.S. Pat. No. 4,152,762 issued May 1, 1979 to Bird et al. Bird et al describe a method and structure for text comparison which is rather complex and requires each desired textual word or phrase to be stored in octal format in one of a plurality of "key memories". In addition, the Bird structure requires the use of additional memories, including a "pointer memory" and a "hash memory", as well as a wide variety of other subcircuits. Thus, the Bird structure is rather complex.

SUMMARY

The present invention attacks the problem of text comparison for the purpose of retrieving textual information from a large data base system from a different point of view. In accordance with this invention, the information stored in a mass memory unit, such as a magnetic disk, is input to a text comparison sub-circuit which includes a decoder means, decoded data memory, and a logical operator section. Each byte of information received from the disk is input to the decoder and is immediately decoded, and a signal corresponding to the unique character corresponding to that byte is generated. The system is capable of handling up to P different characters, where P is a selected positive integer. Corresponding to the pth character (where p is an integer given by $1 \leq p \leq P$) and contained within the decoded data memory is a pth shift register uniquely arranged to receive the signal from the decoder representing the pth character.

The decoded data memory contains a plurality of serial in-parallel out shift registers, one shift register being uniquely associated with each one of the plurality of P different characters forming the data base stored in the storage device. A first signal (e.g. a binary zero) is applied to the input lead of the shift register uniquely associated with the decoded character, and a second signal (e.g. a binary one) is applied to the input leads of all shift registers associated with all other characters. A clock signal is applied to each shift register of the decoded data memory, thus shifting the data on the input lead of each shift register into the least significant bit of the shift register, and shifting each bit previously stored in a shift register to the next most significant bit position within the shift register. In this manner, the decoded data memory will provide signals on the output leads of each shift register indicative of the most recently received character, as well as each of the preceding $(K-1)$ characters (i.e. a "character string" comprising K characters) received from the mass memory unit and decoded, where K is the number of bits contained in each shift register of the decoded data memory. Thus, each bit stored within a shift register will be a binary one except for the binary zero bits stored within a shift register corresponding to the location within the K bit character string of a character corresponding to the shift register. Of importance, only a single shift register within the decoded data memory will store a binary zero bit corresponding to each of the K positions within the K bit character string. By examining the bits stored within each shift register of the decoded data memory, the characters comprising the K bit character string, and their relative position within the character string is determined.

The output leads of the shift registers are connected to the input leads of one or more logical operator sections which include a number of logical gates, such as AND gates and NOR gates, in order to provide an output signal indicating that a desired textual phrase has been located in the mass storage device.

In addition, the logical operator sections include word counters, paragraph counters, and other devices are employed as desired to provide special text comparison functions. The text comparison sub-circuit, the decoded data memory, and the logical operator sections of this invention are capable of operating at very high speeds, equal to the data output speed of the mass memory unit, thus providing a very high speed textual comparison operation.

DETAILED DESCRIPTION

Figure 1:
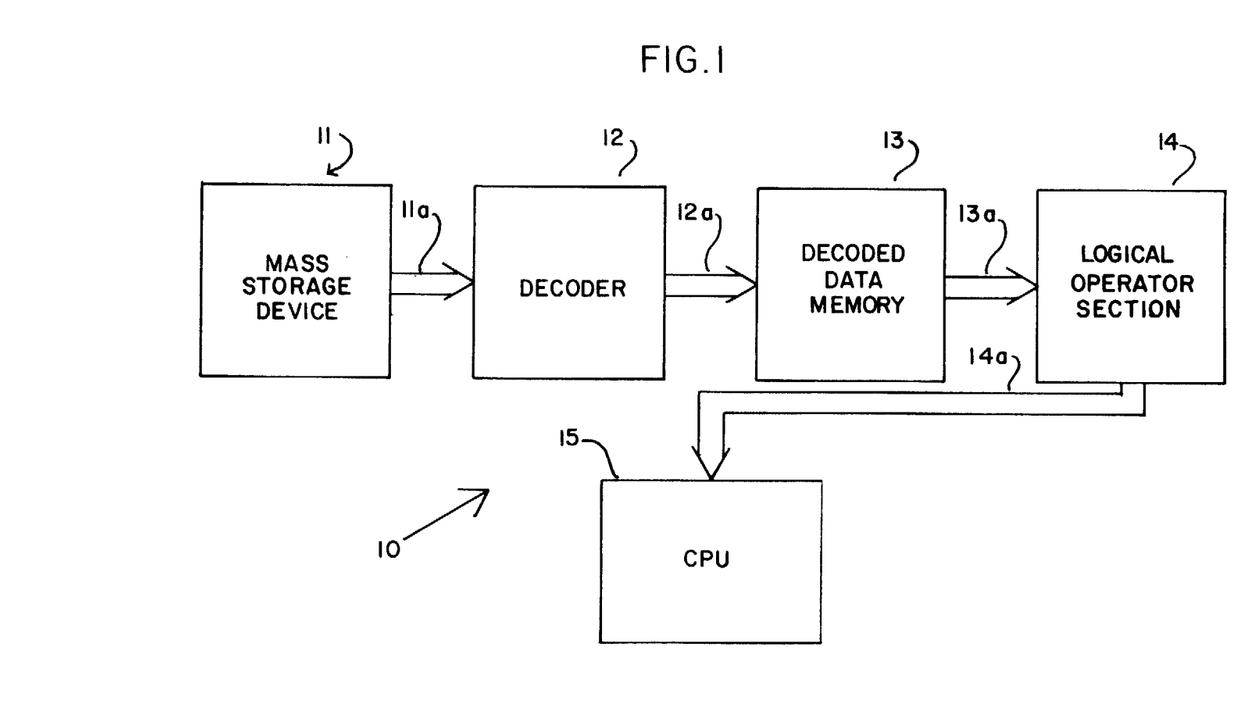
FIG. 1 is a block diagram of a textual comparison system constructed in accordance with this invention.

FIG. 1 shows a block diagram of a text comparator constructed in accordance with this invention. Mass storage device 11 comprises a device suitable for the storage of a large quantity of data. Such data is typically called a "data base". The data base might be, for example, textual material such as United States patents, judicial decisions from various courts, or other information. Mass storage device 11 typically comprises a magnetic disk, as is well known in the computer arts, and the data base stored within mass storage device 11 is typically stored in ASCII format, although this invention can be utilized in conjunction with data bases stored in other than ASCII format (for example, EBCDIC).

Data stored in mass storage device 11 is transferred via bus 11a to decoder 12. Typically, bus 11a comprises a plurality of electrical leads, in order that a plurality of bits forming a single byte of information may be transferred simultaneously from mass storage device 11 to decoder 12. The simultaneous transfer of a plurality of bits forming a single byte is often referred to as "parallel data output".

Decoder 12 receives each byte transferred from mass storage device 11, and decodes that byte into one of a plurality of unique decoded data signals. Each such decoded data signal represents a unique one of the characters which form the data base stored in mass storage device 11. For example, such characters typically comprise the numbers zero through nine, twenty-six capital letters, twenty-six lower case letters, and a variety of punctuation and special symbols such as asterisk, period, comma, question mark, space, and the like. Inasmuch as ASCII is one widely used method of coding such characters into a plurality of bytes, this specification will refer to ASCII coding in order to explain the operation of one embodiment of this invention. However, it is to be understood that this invention is equally useful in systems wherein coding schemes other than ASCII is utilized. A cross reference table listing each character and its ASCII equivalent is given in Table 1.

The output from decoder 12 is connected via bus 12a to decoded data memory 13. Because ASCII comprises a plurality of 96 characters, bus 12a in the preferred embodiment comprises a plurality of 96 leads, one such lead being associated with a unique one of the ASCII characters. However, it should be understood that as many leads as required can be used depending on the number of characters to be decoded and in general bus 12a comprises a plurality of M leads, where M is a selected positive integer representing the number of characters to be decoded.

Decoded data memory 13 stores the decoded data provided by decoder 12 for a sequence of K characters stored in mass storage device 11 where K is a positive integer which is fixed by the particular design of the decoded data memory 13. Typically K will be either eight or sixteen, although K may be any positive integer. Decoded memory 13 comprises a plurality of 96 shift registers, one shift register for each ASCII character. K is equal to the number of bits which are stored within each shift register. The data (i.e., a logical one or a logical zero) contained in each of the K bits of the 96 shift registers of decoded data memory 13 indicates which ASCII characters form each character of the K byte character string ending in the most recently decoded character.

An output bus 13a, containing a number of leads equal to K96 (K96 equals K multiplied by 96), connects each of the K96 output leads of the 96 shift registers of decoded data memory 13 to logical operator section 14. Logical operator section 14 comprises one or more logical gates which perform a logical operation on the data stored in the shift registers of decoded data memory 13. This logical operation provides an output signal indicating when a desired textual phrase, string of characters, or sets of strings of characters, has been located within the data base stored in mass storage device 11. This output signal from logical operator section 14 is applied via bus 14a to central processing unit (CPU) 15. Thus, central processing unit 15 is made aware that a desired textual phrase has been located in mass storage device 11. CPU 15 then follows its set of programmed instructions, and utilizes the desired textual phrase which has been located in the data base. Typically, CPU 15 stores the address location of the beginning of the desired textual phrase which has been located in the data base, stores the record number of the record (i.e., patent number, etc.) in which the desired textual phrase has been found, or performs other desired tasks in response to the location and identification of the desired textual phrase within the data base. It is to be understood that, once the desired textual phrase has been located within the data base stored in mass storage device 11, and the CPU signalled by logical operator section 14, the operation of CPU 15 is generally the same as the operation of central processing units in systems utilizing prior art text comparison techniques.

Figure 2:
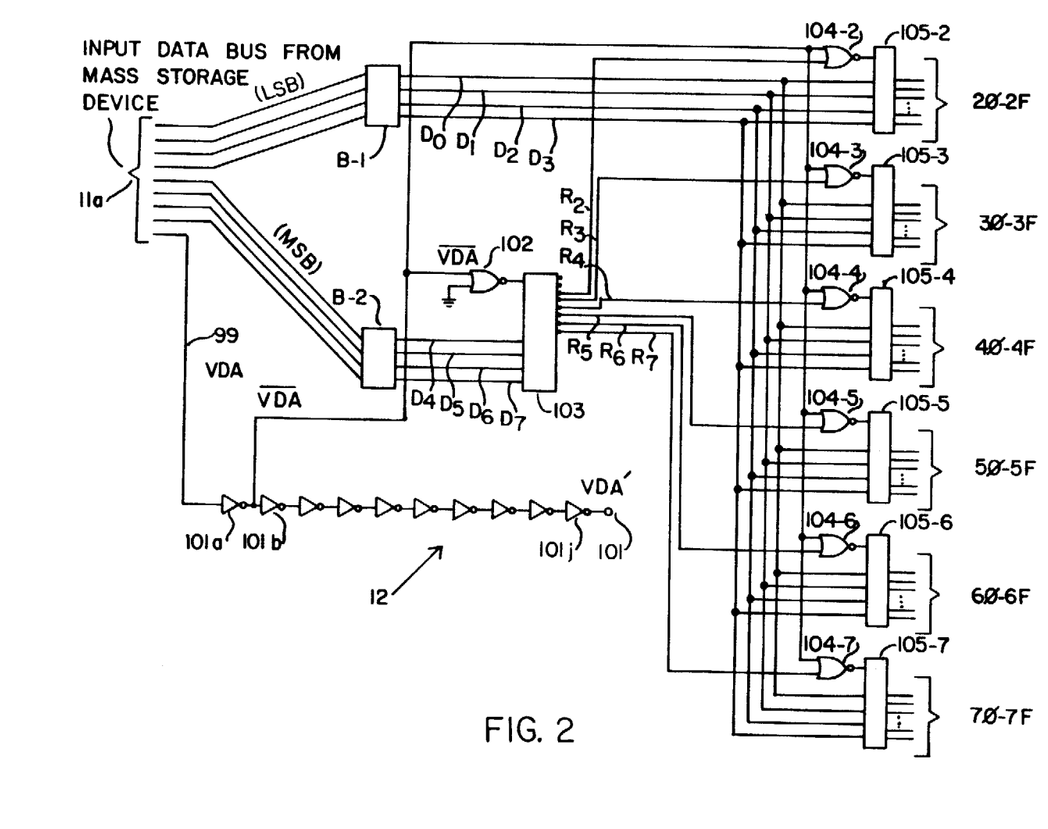
FIG. 2 is a diagram of a decoder means utilized in accordance with this invention.

Referring to FIG. 2, the detailed operation of decoder 12 will now be explained. The embodiment of decoder 12 shown in FIG. 2 is designed for use with systems utilizing ASCII coding. For systems utilizing other than ASCII coding, the specific design of decoder 12 differs from that shown in FIG. 2, but is easily provided by one of ordinary skill in the art, in light of the teachings of this specification. In ASCII format, as shown in Table 1, each character comprises eight binary digits (bits) or two hexidecimal digits. Input bus 11a comprises eight leads, thus providing to decoder 12 in a parallel output format the 8 bits forming a single ASCII character stored in mass storage device 11 (FIG. 1). Input bus 11a also comprises an additional lead 99, which provides a valid data signal (VDA) which, when high (logical "1") indicates that valid data is available on bus 11a from mass storage device 11. The four least significant bits (LSB) of the ASCII btye received from bus 11a are applied to four bit buffer B-1, thus providing on leads $D_0$ through $D_3$ buffered signals representing the four least significant bits of the ASCII byte. Similarly, the four most significant bits (MSB) of the ASCII byte received on bus 11a are applied to four bit buffer B-2, thus providing on leads D-7 through D-4 buffered signals representing the four most significant bits of the ASCII byte. Buffers B-1 and B-2 may comprise, for example, a 74125 device, such as manufactured and sold by Texas Instruments.

The buffered four least significant bits (on leads $D_0$ through $D_3$) are applied as input signals to demultiplexers 105-2 through 105-7 and the buffered four most significant bits (on leads D-7 through D-4) are applied as input signals to demultiplexer 103. Demultiplexers 103 and 105-2 through 105-7 are four bit to sixteen bit demultiplexers such as the 74LS154 manufactured and sold by Texas Instruments. Thus, each demultiplexer 103 and 105-2 through 105-7 provides a one of sixteen bit demultiplexing function, although only six of the sixteen output signals from demultiplexer 103 (on leads $R_2$ through $R_7$) are used because, as previously mentioned, ASCII comprises 96 characters, and these 96 characters are uniquely defined by the output leads of six separate four-to-sixteen bit demultiplexers 105-2 through 105-7, as will be more fully described below. Accordingly, as shown in Table 1, the four most significant bits of an ASCII byte range from a binary 0001 (a decimal 1) to a binary 0111 (a decimal 7).

The output signal on each output lead of demultiplexers 103 and 105-2 through 105-7 is normally high (logical one). Each demultiplexer has as many output leads (16) as there are different binary input signals (16) which can be applied to its four input leads. Each output lead corresponds uniquely to one possible input signal to the demultiplexer. However, when a four bit input signal (the four most significant bits on leads D-4 through D-7 connected to demultiplexer 103, or the four least significant bits on leads $D_0$ through $D_3$ applied to demultiplexers 105-2 through 105-7) is input to a demultiplexer, and that demultiplexer is enabled (to be more fully described below), a logical zero is placed on the output lead corresponding to the input signal applied to the demultiplexer. For example, if a four bit binary input signal 0101 is applied to a demultiplexer, and that demultiplexer is enabled, the output lead 5 (corresponding to a binary 0101) of the demultiplexer will be low, and all other output leads of the demultiplexer will be high. All output leads of a disabled demultiplexer are high.

Demultiplexers 103 and 105-2 through 105-7 are enabled by the application of a low signal to their respective enable terminals. This occurs only when valid data is present on bus 11a from the mass storage device. As previously described, a logical one on valid data lead 99 indicates that valid data is present on bus 11a. This logical one signal is inverted by inverter 101a, and a logical zero $\overline{VDA}$ signal is applied to NOR gate 102 and NOR gates 104-2 through 104-7. Although NOR gates 102 and 104-2 through 104-7 are shown external to demultiplexers 103 and 105-2 through 105-7, these NOR gates are an integral part of the 74LS154 devices. The output lead of NOR gate 102 is connected to the enable input lead of demultiplexer 103, and the output leads of NOR gates 104-2 through 104-7 are connected to the enable input leads of demultiplexers 105-2 through 105-7, respectively. Thus, with a low VDA signal on lead 99, indicating that valid data is not present on input bus 11a, the $\overline{VDA}$ signal from the output lead of inverter 101a will be high, thus causing the output signal from NOR gates 102 (having its other input lead connected to ground) to be low, thus disabling demultiplexer 103. With demultiplexer 103 disabled, leads $R_2$ through $R_7$ will all be high; thus disabling demultiplexers 105-2 through 105-7.

On the other hand, with a logical high on VDA lead 99, indicating that valid data is present on input bus 9, the $\overline{VDA}$ signal will be low. Because one input lead of NOR gate 102 is connected to ground (logical zero) and the other input lead of NOR gate 102 is connected to $\overline{VDA}$, a low $\overline{VDA}$ signal causes the output signal from NOR gate 102 to go high, thus enabling demultiplexer 103. Demultiplexer 103 then demultiplexes the four most significant bits, thus providing a logical low on the unique output lead $R_2$ through $R_7$ corresponding to the value of the four most significant bits ($D_4$ through $D_7$). Output leads $R_2$ through $R_7$ of demultiplexer 103 are connected to one input lead of NOR gates 104-2 through 104-7, respectively, with the other input lead of NOR gates 104-2 through 104-7 being connected to $\overline{VDA}$. With a logical low $\overline{VDA}$ signal applied to one lead of NOR gates 104-2 through 104-7 and a logical low signal corresponding to the demultiplexed most significant bits of a unique one of leads $R_2$ through $R_7$ applied to the other lead of one of the NOR gates 104-2 through 104-7, a high signal will be generated on the output lead of the NOR gate 104-2 through 104-7 corresponding to the value of the most significant bits D4 through D7. 07. Thus, upon receipt of valid data (high VDA signal) a selected one of demultiplexers 105-2 through 105-7 will be enabled, and all other demultiplexers 105-2 through 105-7 will be disabled by the logical high signal on the remaining leads $R_2$ through $R_6$. For example, with a high VDA signal, indicating receipt of valid data, and the four most significant bits equal to 0010, demultiplexer 103 is enabled and a low signal generated on lead $R_2$, with leads $R_3$ through $R_7$ remaining high. Demultiplexer 105-2 is enabled by the low $\overline{VDA}$ signal and the low signal on lead $R_2$. Demultiplexers 105-3 through 105-7 remain disabled by the high level signals on leads $R_3$ through $R_7$, respectively.

The output signals on each output lead of the disabled demultiplexers 105-2 through 105-7 will be high, as previously described. The signals on the output leads of the enabled one of demultiplexers 105-2 through 105-7 will be high, except for the single output lead which corresponds to the decoded least significant bits on leads $D_0$ through $D_3$ connected to the input leads of demultiplexers 105-2 through 105-7. In this manner, upon the receipt of valid data on bus 11a, a single low signal is generated on a single output lead of demultiplexers 105-2 through 105-7. The lead which contains that low signal corresponds to the character represented by the 8-bit ASCII byte received on bus 11a. For example, with a high VDA signal and an eight bit byte equal to 01101101 received on bus 11a, demultiplexer 103 will be enabled, as previously described, and the four most significant bits (0110) demultiplexed by demultiplexer 103, thereby generating a logical low signal on output lead $R_6$. This will enable demultiplexer 105-6, which in turn demultiplexes the four least significant bits (1101), thereby generating the signals on a logical low on output lead 6D of demultiplexer 105-6, with all other output leads of demultiplexer 105-6 remaining high. Output lead 6D corresponds to the ASCII character m, represented by 01101101. A high signal is present on leads $R_2$, $R_3$, $R_4$, $R_5$ and $R_7$, thus disabling demultiplexers 104-2, 104-3, 104-4, 104-5, and 104-7, thereby providing high signals on output leads 2∅ through 5F and 7∅ through 7F. For convenience, the output leads from demultiplexers 105-2 through 105-7 are numbered with two digits. The first digit indicates which of the six demultiplexers 105-2 through 105-7 is connected to the lead, and the second digit indicates the lead number (represented in hexidecimal as 0 through F). Utilizing this notation, the first digit also represents the four most significant bits of the data word received on bus 11a, and the second digit also represents the four least significant bits of the data word received on bus 11a.

Inverters 101a through 101j provide a time delayed VDA' signal. By applying the valid data signal (VDA) on lead 99 to the input lead of inverter 101a, a time delayed valid data signal (VDA') is generated by inverter 101j on node 101. The VDA' signal is delayed from the VDA signal by approximately 100 nanoseconds. The VDA' signal is used to enable the decoded data memory 13 (FIG. 1) to receive data from output leads 2∅ through 7F of decoder 12, but provides a time delay sufficient to allow the proper operation of decoder 12 prior to the receipt of decoded data by decoded data memory 13. Each inverter 101a through 101j may comprise, for example, one of the six inverters comprising a 7404 Hex inverter, such as is manufactured and sold by Texas Instruments.

Figures 3, 4, 5A, 5B, 5C, 5D:
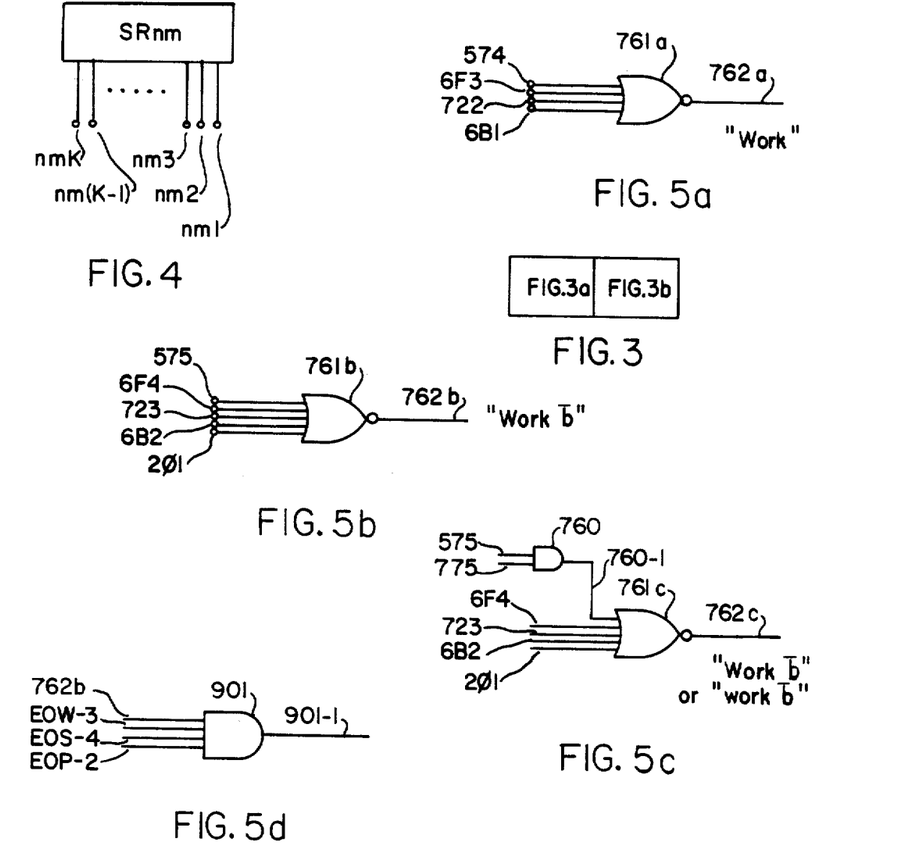
FIG. 3 is a diagram showing the interrelation of FIGS. 3a and 3b.
FIG. 4 is a diagram of one shift register of the decoded data memory of FIG. 3.
FIGS. 5a through 5e are diagrams of specific embodiments of the logical operator section of this invention.
Figure 3A:
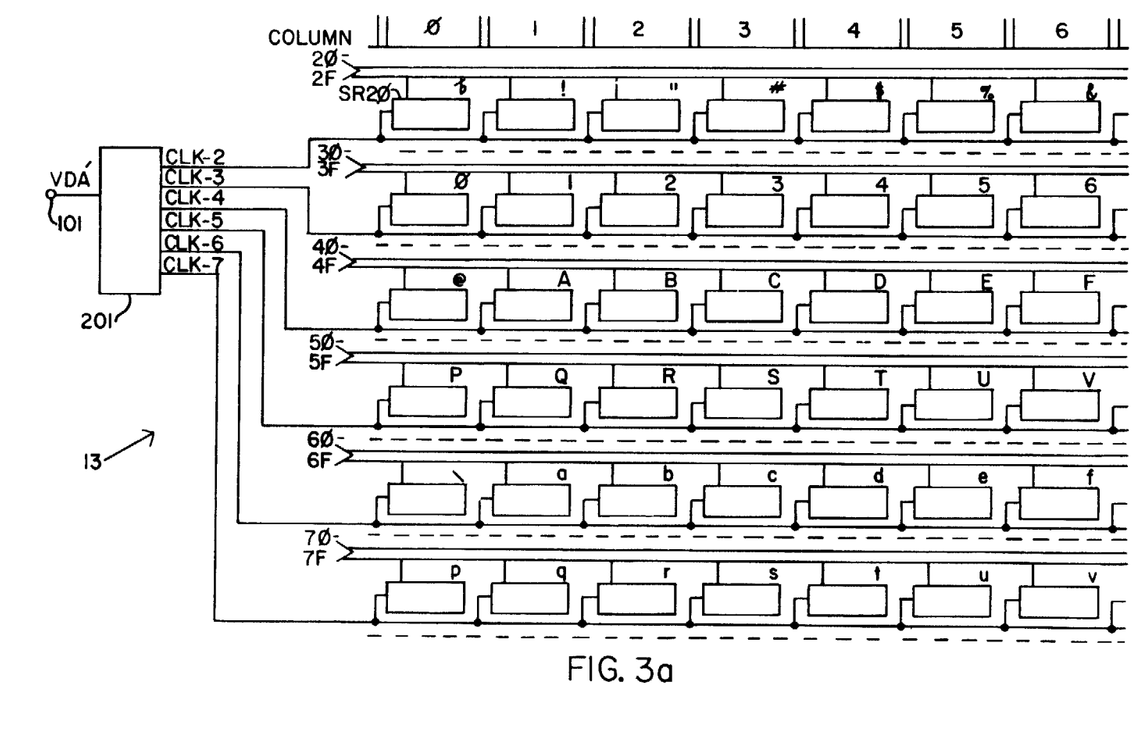
FIGS. 3a and 3b are diagrams of the decoded data memory constructed in accordance with this invention.
Figure 3B:
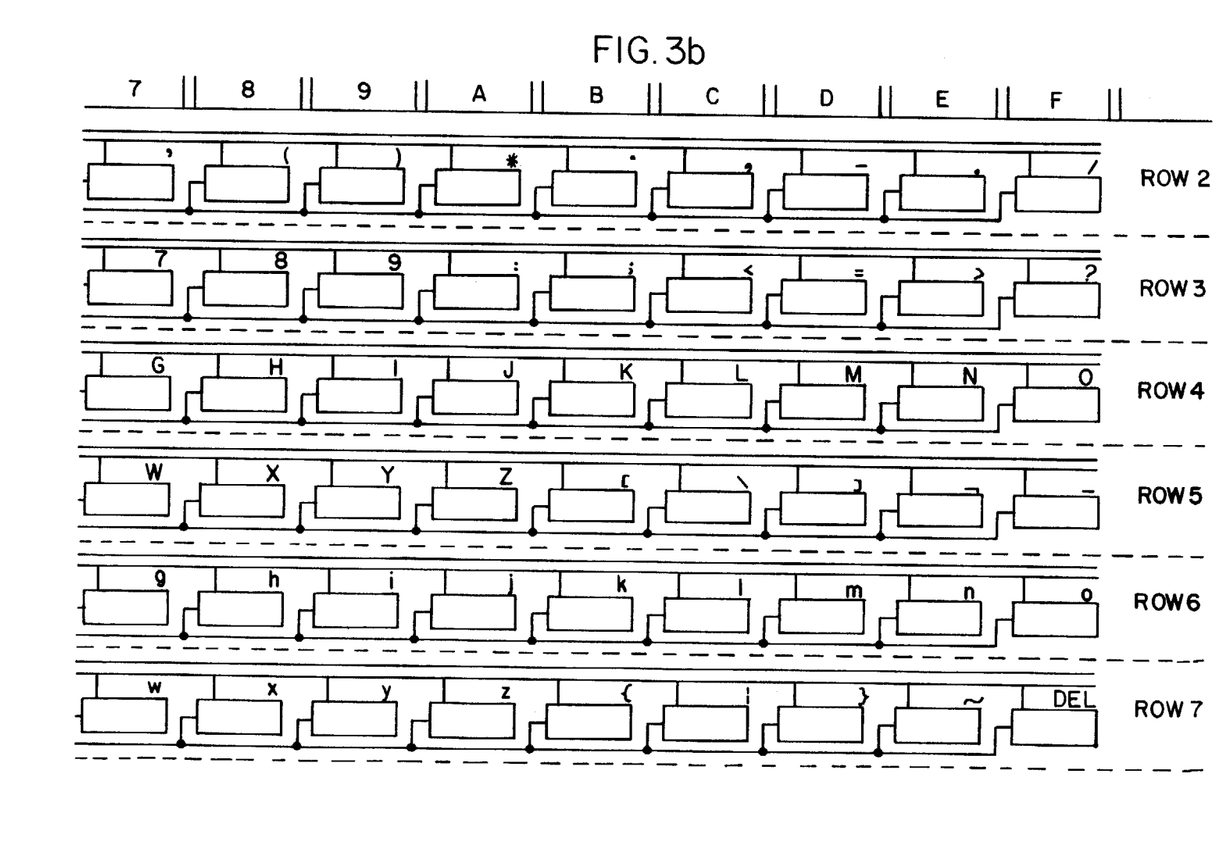

Referring to FIGS. 3a and 3b, the operation of decoded data memory 13 will now be explained. Upon the receipt of a high VDA' signal (corresponding to valid data on input bus 11a of decoder 12) on node 101 of decoded data memory 13, buffer 201 provides high clock signals CLK-2 through CLK-7. Buffer 201 may comprise, for example, a 74365 device manufactured and sold by Signetics.

Decoded data memory 13 comprises a plurality of shift registers such as shift register SR2∅. For purposes of clarity, the plurality of 96 shift registers are not individually labelled; only shift register SR2∅ is so labelled. However, the array of shift registers of decoded data memory 13 of FIGS. 3a and 3b are arranged in a matrix comprising six rows (row 2 through row 7) and sixteen columns (column ∅ through column F). Thus, shift register SR2∅ is the shift register located at the intersection of row 2 and column ∅. In a similar manner, the shift register located at the intersection of row n and column m will be referred to as shift register SRnm in this specification.

Each shift register SRnm (where n and m are positive integers given by $1 \leq m \leq M$) and $1 \leq m \leq M$) is connected to a unique one nm of leads 2∅ through 7F which corresponds to that shift register. Thus, shift register SR2∅ is connected to lead 2∅ and shift register SRnm is connected to lead nm. Leads 2∅, nm and NM in turn are connected to the decoder 12 of FIG. 2. In this fashion, each shift register of the decoded data memory 13 is connected to a unique output lead of decoder 12 (FIG. 2), thereby causing each shift register of decoded data memory 13 to correspond to a unique one of the 96 ASCII characters. For convenience, the ASCII character associated with each shift register is indicated above the shift register. Thus, shift register SR2∅, connected to lead 2∅, corresponds to a blank (b̄) which is coded in ASCII as a hexidecimal "2∅", as shown in Table 1. In a similar manner, each of the 96 shift registers of decoded data memory 13 corresponds to a unique ASCII character. As previously mentioned, each shift register SRnm is capable of storing K bits, thus allowing decoded data memory 13 to store K decoded characters and their relative position within the string of K characters.

Clock signals CLK-2 through CLK-7 are connected to each shift register within row 2 through row 7, respectively. Upon the receipt of a high VDA' signal, CLK-2 through CLK-7 go high. The low to high transition of clock signals CLK-2 through CLK-7 enables all shift registers of rows 2 through 7, respectively, of decoded data memory 13. Enabling each shift register causes the signal on the signal lead connected to that shift register to be stored in the least significant bit of the shift register, and all other data previously stored shifted to the next most significant bit. Thus, for example, if a logical zero is present on signal lead 2∅, and a high VDA' signal is received, CLK-2 will go high, thus causing the logical zero on lead 2∅ to be stored in the least significant bit of shift register SR2∅. All other data previously stored in shift register SR2∅ will be shifted to the next most significant bit, with the previously stored most significant bit being lost.

The plurality of shift registers comprising decoded data memory 13 may comprise, for example, eight bit serial in, parallel out shift registers, such as 74164 devices manufactured and sold by Signetics. Alternatively, each shift register SR2∅ through SR7F may comprise a plurality of 74164 devices serially connected in order to increase the number of bits which are stored within each of the 96 shift registers forming decoded memory 13.

Of importance, only a single logical zero will be present on signal leads 2∅-7F at any time. Thus, the unique one of the 96 shift registers which corresponds to the most recently decoded byte from mass storage device 11 will store a least significant bit equal to a logical zero, while all other shift registers will store a least significant bit equal to a logical one. Thus, for example, if a blank was the most recently decoded ASCII character, decoded data memory 13 will indicate this fact by the presence of a logical zero as the least significant bit of shift register 2∅, with the least significant bits of all other shift registers SRnm being equal to a logical one. In a similar fasion, the previously decoded character will be indicated by the presence of a logical zero as the next to least significant bit stored in the shift register corresponding to the previously decoded character. Thus, if an "!" was the previously decoded character, the next to least significant bit stored within shift register SR21 (corresponding to the exclamation point) will be a logical zero, and the next to least significant bit stored within all other shift registers will be a logical one. In this manner, each of the most recently decoded K characters are indicated by the location of logical zeros within the shift register of decoded data memory 13, where K is the number of bits stored in each shift register.

An example of the ability of decoded data memory 13 to store a character string which is decoded by decoder 12 (FIG. 1) will now be given. Initially all bits contained within each of the 96 shift registers of decoded data memory 13, comprise logical ones. This may be accomplished, for example, by providing a low VDA signal, thus disabling demultiplexers 105-2 through 105-7 (FIG. 2), and thereby providing logical one signals on leads 2∅ through 7F, and providing a series of K low to high transitions on terminal 101, thus shifting a series of K logical one signals into each K bit shift register (SR2∅ through SR7F) of decoded data memory 13. These low to high transitions on terminal 101 are easily provided with well known circuitry (not shown).

If the word "Work" is to be decoded by decoder 12, the 8 bits corresponding to the hexadecimal ASCII code 57 for a "W" will be output from mass storage device 11 to input bus 11a of decoder 12 (FIG. 2). A valid data signal (high VDA) will also be made available on bus 11a. Demultiplexer 103 will be enabled, and a logical low signal generated on lead R₅ corresponding to the most significant bits of the ASCII code for W. The logical low on lead R$_5$, and the low $\overline{VDA}$ signal will enable demultiplexer 105-5. Demultiplexer 105-5 then demultiplexes the least significant bits, and provides a logical low on output lead 57. All remaining output leads of demultiplexers 105-2 through 105-7 remain high at this time. The output signals on demultiplexers 105-2 through 105-7 are then (after the time delay provided by inverters 101a through 101j) shifted into the least significant bit positions of their corresponding shift registers of decoded data memory 13 (FIG. 3). Thus, the least significant bit of shift register SR57 will store a logical zero, and the least significant bits of all remaining shift registers will store a logical one. The shift register SR57 will store the bits 111∅, and all other shift registers will store the bits 1111, if shift registers SR2∅ through SR7F comprise four bit shift registers.

The letter "o" (hexadecimal 6F) is then output from mass storage device 11 to decoder 12 (FIG. 2). Demultiplexer 103 decodes the four most significant bits D$_4$ through D$_7$ and provides a logical low signal on output lead R$_6$. The low signal on lead R$_6$, together with the low $\overline{VDA}$ signal, enables demultiplexer 105-6. Demultiplexer 105-6 then decodes the four least significant bits D$_0$ through D$_3$, and provides a logical low signal on output lead 6F. All signals on all remaining output leads of demultiplexers 105-2 through 105-7 are logical ones at this time. The signals on the output leads of demultiplexers 105-2 through 105-7 are then shifted into the least significant bit of their associated shift registers of decoded data memory 13 (FIG. 3). At this time, shift register SR6F corresponding to the character "o" will store the bits 1110, indicating that a "o" has been the most recently decoded character. Similarly, shift register SR57 will store the bits 1101, indicating that the character "W" was the previously decoded character. All others shift registers of decoded data memory 13 will store the bits 1111 indicating that their associated characters are not one of the last four characters decoded.

The character "r" (hexadecimal 72) is now output from mass storage device 11 to decoder 12 (FIG. 2). Demultiplexer 103 decodes the most significant bits of the character "r", and provides a logical zero signal on output lead R$_7$. Demultiplexer 105-7 is thus enabled, and provides a logical zero signal on output lead 72, with the signals on all other output leads 2∅ through 7F being logical ones. The signals on the output leads of demultiplexers 105-2 through 105-7 are then shifted into decoder data memory 13 (FIG. 3). Shift register SR72 will store the bits 1110, shift register SR6F will store the bits 1101, shift register SR57 will store the bits 1011, and all remaining shift registers will store the bit 1111, indicating that the character string "Wor" has been decoded.

The ASCII character "k" hexadecimal 6B) is then output from mass storage device 11 to decoder 12 (FIG. 2). Demultiplexer 103 decodes the most significant bits of the ASCII character, thus providing a logical zero signal on lead R$_6$. The logical zero signal on lead R$_6$ enables demultiplexer 105-6. Demultiplexer 105-6 demultiplexes the least significant bits of the ASCII character, thereby providing a logical zero signal on output lead 6B, with logical ones being present on all other output leads 2∅ through 7F. The data on the output leads of demultiplexer 105-2 through 105-7 is then shifted into decoded data memory 13 (FIG. 3a). At this time, shift register SR6B will store the bits 1110, shift register SR72 will store the bits 1101, shift register 6F will store the bits 1011, and shift register SR57 will store the bits 0111, indicating that the character string "Work" has been decoded.

TABLE 1

| Character | ASCII Code (Binary) | ASCII Code (Hexidecimal) | Character | ASCII Code (Binary) | ASCII Code (Hexidecimal) |
|---|---|---|---|---|---|
| blank | 00100000 | 20 | P | 01010000 | 50 |
| ! | 00100001 | 21 | Q | 01010001 | 51 |
| " | 00100010 | 22 | R | 01010010 | 52 |
| # | 00100011 | 23 | S | 01010011 | 53 |
| $ | 00100100 | 24 | T | 01010100 | 54 |
| % | 00100101 | 25 | U | 01010101 | 55 |
| & | 00100110 | 26 | V | 01010110 | 56 |
| ' | 00100111 | 27 | W | 01010111 | 57 |
| ( | 00101000 | 28 | X | 01011000 | 58 |
| ) | 00101001 | 29 | Y | 01011001 | 59 |
| * | 00101010 | 2A | Z | 01011010 | 5A |
| + | 00101011 | 2B | [ | 01011011 | 5B |
| , | 00101100 | 2C | \ | 01011100 | 5C |
| - | 00101101 | 2D | ] | 01011101 | 5D |
| . | 00101110 | 2E | ¬ or ∧ | 01011110 | 5E |
| / | 00101111 | 2F | — | 01011111 | 5F |
| ∅ | 00110000 | 30 |   | 01100000 | 60 |
| 1 | 00110001 | 31 | a | 01100001 | 61 |
| 2 | 00110010 | 32 | b | 01100010 | 62 |
| 3 | 00110011 | 33 | c | 01100011 | 63 |
| 4 | 00110100 | 34 | d | 01100100 | 64 |
| 5 | 00110101 | 35 | e | 01100101 | 65 |
| 6 | 00110110 | 36 | f | 01100110 | 66 |
| 7 | 00110111 | 37 | g | 01100111 | 67 |
| 8 | 00111000 | 38 | h | 01101000 | 68 |
| 9 | 00111001 | 39 | i | 01101001 | 69 |
| : | 00111010 | 3A | j | 01101010 | 6A |
| ; | 00111011 | 3B | k | 01101011 | 6B |
| < | 00111100 | 3C | l | 01101100 | 6C |
| = | 00111101 | 3D | m | 01101101 | 6D |
| > | 00111110 | 3E | n | 01101110 | 6E |
| ? | 00111111 | 3F | o | 01101111 | 6F |
| @ | 01000000 | 40 | p | 01110000 | 70 |
| A | 01000001 | 41 | q | 01110001 | 71 |
| B | 01000010 | 42 | r | 01110010 | 72 |
| C | 01000011 | 43 | s | 01110011 | 73 |
| D | 01000100 | 44 | t | 01110100 | 74 |
| E | 01000101 | 45 | u | 01110101 | 75 |
| F | 01000110 | 46 | v | 01110110 | 76 |
| G | 01000111 | 47 | w | 01110111 | 77 |
| H | 01001000 | 48 | x | 01111000 | 78 |
| I | 01001001 | 49 | y | 01111001 | 79 |
| J | 01001010 | 4A | z | 01111010 | 7A |
| K | 01001011 | 4B | { | 01111011 | 7B |
| L | 01001100 | 4C | ! | 01111100 | 7C |
| M | 01001101 | 4D | } | 01111101 | 7D |
| N | 01001110 | 4E | ~ | 01111110 | 7E |
| O | 01001111 | 4F | DEL | 01111111 | 7F |

A detailed view of the output leads of the shift registers of decoded data memory 13 is shown in FIG. 4. Shift register SRnm, corresponding to the shift register at the intersection of row n and column m, has a plurality of K output leads for examining the K bits stored within shift register SRnm. Thus, the least significant bit stored within shift register SRnm is available on lead nm1, the next to the least significant bit is available on lead nm2, and the most significant bit is available on lead nmK.

Logical operator section 14 comprises one or more logical gates which may be hard wired to decoded data memory 13, or alternatively programmably connected under computer control, as described later. One embodiment of logical operator section 14 (FIG. 1) is shown in FIG. 5a. Here, NOR gate 761a is connected so as to provide a logical one signal on output lead 762a when the character string "Work" has been located in mass storage device 11 (FIG. 1). When the character string "Work" has been received, the fourth least significant bit of shift register SR57 (as provided on lead 574), the third least significant bit of shift register SR6F (as provided on lead 6F3), the second least significant bit of shift register SR72 (as provided on lead 722), and the least significant bit of shift register SR6B (as provided on lead 6B1), will all be equal to logical zeros. Thus, upon receipt of the character string "Work", the output signal on lead 762a of NOR gate 761 (having its input leads connected to leads 574, 6F3, 722 and 6B1) will be a logical one, in contrast to the logical low signal present on lead 762a at all other times.

Because the character string "Work" will be detected by NOR gate 761a upon decoding of the first four letters of the word "Working" as well as for the word "Work", when seeking to locate a character string equivalent to the word "Work", and not any variations thereof, the logical operator section 14 (FIG. 1) is programmed to locate the character string "Workb̄" (where b̄ is a blank character). This is depicted in FIG. 5b, where NOR gate 761b requires the fifth least significant bit of shift register SR57 (on lead 575), the fourth least significant bit of shift register SR6F (on lead 6F4), the third least significant bit of shift register SR72 (on lead 723), the second least significant bit of shift register SR6B (on lead 6B2), and the least significant bit of shift register SR2∅ (on lead 2∅1) to all be logical zeros in order for the signal on lead 762a to be a logical one, indicating receipt of the character string "Workb̄".

By the appropriate connection of additional gates, logical operator section 14 may perform other search functions. For example, if it is desired to locate within mass storage device 11 all occurrences of either the word "Workb̄" or "workb̄", the circuit of FIG. 5c will serve as logical operator section 14. Here, the input leads of AND gate 760 are connected to leads 575 (from shift register 57 corresponding to the capital letter "W") and 775 (from shift register 77 corresponding to the lower case letter "w"). Thus, a logical low on either lead 575 or lead 775 will provide a logical low signal on lead 760-1, which in turn is connected to an input lead of NOR gate 761C. The remaining input leads of NOR gate 761C are connected to leads 6F4, 723, 6B2, and 1∅1, as in the embodiment of FIG. 5b. In this manner, a logical high output signal is provided on lead 762C when either of the desired words "Workb̄" or "workb̄" are located.

In many data base systems, additional symbols are used to indicated the end of a word (EOW), the end of a sentence (EOS), the end of a paragraph (EOP), and the end of a document (EOD). These additional symbols may comprise eight bit bytes which do not form one of the 96 ASCII characters (i.e. comprise ∅∅ through ∅F or 8∅ through 8F). Alternatively, these additional symbols may comprise one or more ASCII characters. For example, the end of sentence signal (EOS) may comprise a period followed by two blanks. Additional shift registers are utilized to serve as word counters, sentence counters, and paragraph counters.

Figure 6A:
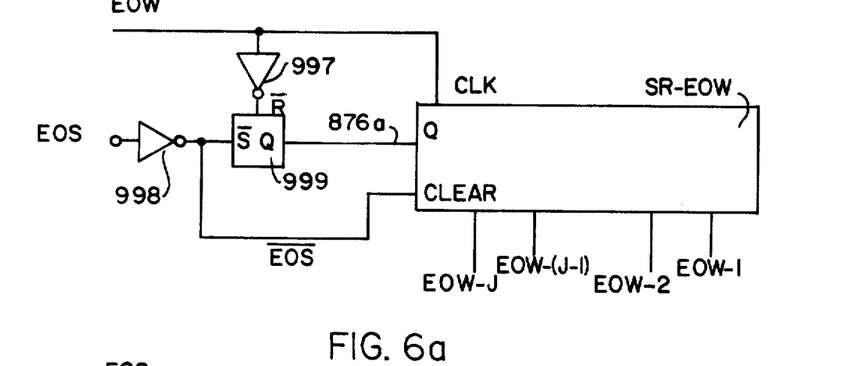
FIG. 6a is a diagram of one embodiment of a word counter of this invention.

An example of a word counter, which indicates which word within a sentence is being decoded, is shown in FIG. 6a. Shift register SR-EOW may comprise a 74164 8-bit serial-in, parallel-out shift register, as has been previously described for the shift registers of decoded data memory 13. Alternatively, a plurality of 8-bit shift registers may be connected serially, thus providing shift register SR-EOW which is capable of storing greater than 8 bits. As shown in FIG. 6a, shift register SR-EOW is provided a clock signal by the end of word (EOW) signal. Thus, shift register SR-EOW is clocked upon receipt of an EOW signal, thereby shifting data on input lead 876a into shift register SR-EOW and shifting data stored in the shift register to the next most significant bit. Input lead 876a is connected to the output lead of SR flip flop 999 (which may comprise a 74LS279 device manufactured by Signetics). On receipt of a high EOS signal, indicating the end of a sentence, a logical low $\overline{EOS}$ signal is generated by inverter 998 (e.g. a 7404 device) and applied to the clear input lead of shift register SR-EOW, thus clearing shift register SR-EOW (i.e. shift register SR-EOW stores all zeroes when clear). This low $\overline{EOS}$ signal also causes flip flop 999 to provide a high output signal on lead 876a. Upon the receipt a high EOW signal, indicating the end of a word, the high output signal on lead 876a is clocked into the least significant bit of shift register SR-EOW. Also, upon receipt of a high EOW signal, inverter 997 provides a low $\overline{R}$ signal to reset flip flop 999, thus causing flip flop 999 to provide a low output signal. This low output signal is input to shift register SR-EOW by the operation of subsequent EOW signals applied to the clock input lead of shift register SR-EOW, thereby shifting the low Q signal on the output lead of flip flop 999 into the least significant bit of shift register SR-EOW, and shifting the data stored in each bit of shift register SR-EOW to the next significant bit. Thus, the signal initially stored within the least significant bit of shift register SR-EOW in response to a high EOS signal is shifted to the left (i.e. the next most significant bit) upon receipt of each EOW signal. In this manner, the signal on leads EOW-1 through EOW-j, where j is the number of bits stored within shift register SR-EOW, indicate which word within the sentence is being decoded. Thus, for example, if a logical one is present on lead EOW-1, the first word in the sentence is being decoded. Similarly, where a logical one is present on lead EOW-2, the second word of the sentence is being decoded. Of importance, only a single logical one will be present on leads EOW-1 through EOW-j. This is accomplished by applying a high signal to the "clear" input lead of shift register SR-EOW upon receipt of a high EOS signal, thus resetting all bits stored in shift register SR-EOW to logical zeros immediately prior to the storage of a logical one in the least significant bit of shift register SR-EOW when a high EOS (End of Sentence) signal is applied to input lead 876.

Figure 6B:
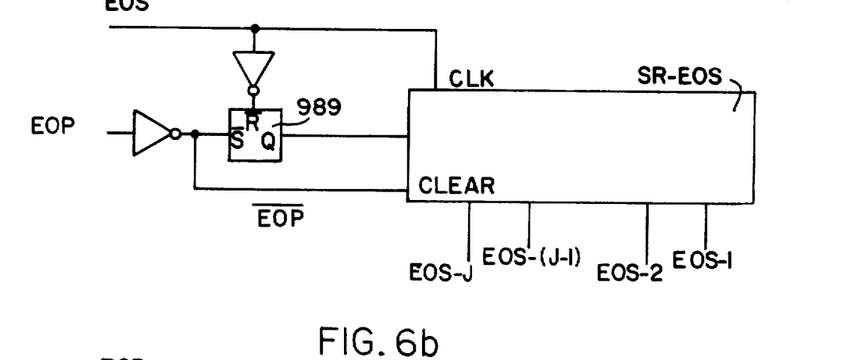
FIG. 6b is a diagram of one embodiment of a sentence counter of this invention.

A sentence counter is shown in FIG. 6b. The sentence counter, comprising shift register SR-EOS having output leads EOS-1 through EOS-j, operates in a similar manner as the word counter of FIG. 6a. However, flip flop 989 has its input lead connected to the EOP (End of Paragraph) signal, thereby clearing shift register SR-EOS and setting flip flop 989 high upon receipt of each EOP signal. Upon the receipt of a high EOS signal, shift register SR-EOS is clocked in a similar manner as SR-EOW (FIG. 6a), thereby storing a logical one in the least significant bit of shift register SR-EOS upon receipt of the first sentence of each paragraph, and clocking this logical one to the next significant bit upon receipt of each sentence. Thus, the presence of a logical one on a unique one of leads of EOS-1 through EOS-j indicates which sentence in a paragraph is being decoded.

Figure 6C:
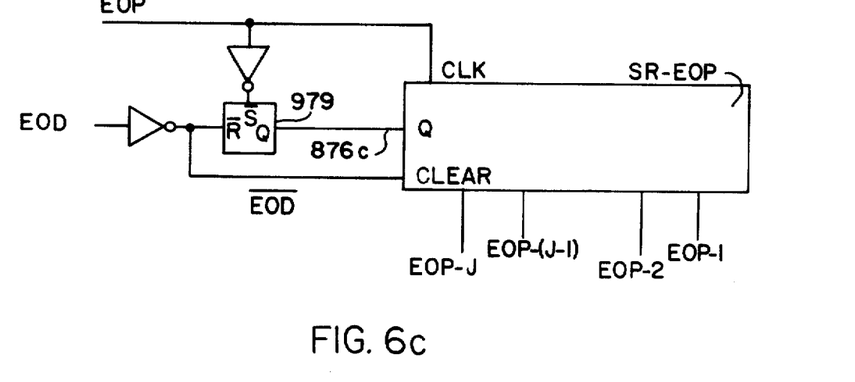
FIG. 6c is a diagram of one embodiment of a paragraph counter of this invention.

A paragraph counter is shown in FIG. 6c. The paragraph counter, comprising shift register SR-EOP having output leads EOP-1 through EOP-j, operates in a similar manner as the word counter of FIG. 6a and the sentence counter of FIG. 6b. However, the EOP signal provides a clock signal to the paragraph counter SR-EOP. The input lead 876c of the paragraph counter is connected to the output lead of RS flip flop 979, which is set by the EOD (End of Document) signal. The clear input lead is activated upon receipt of a high EOD signal. In this manner, the logical one appearing on a unique one of output leads EOP-1 through EOP-j indicates which paragraph within the document is being decoded.

Utilizing the word counter, sentence counter, paragraph counter, and decoded data memory 13, complex full-text searching may be accomplished. For example, if it is desired to locate a document stored within mass storage device 11 in which the word "Workb̄" appears in the third word of the fourth sentence of the second paragraph, the circuit of FIG. 5d is used. The circuit of FIG. 5d comprises AND gate 901 having one input lead connected to output lead 762b of the circuit of FIG. 5b. Thus, a logical high signal will be input to AND gate 901 on lead 762b when the character string "Workb̄" is decoded. Similarly, a logical high signal will be input to AND gate 901 when the third least significant bit of the word counter is a logical one, indicating that the third word is being decoded. This high signal will be available on lead EOW-3. In a similar manner, when the fourth sentence of the paragraph is being decoded, a logical high will be applied at an input signal to AND gate 901 on lead EOS-4, and when the second paragraph of a document is being decoded, a high input signal will be applied to AND gate 901 on lead EOP-2. Thus, a logical high signal will be present on output lead 901-1 only when the word "Workb̄" is decoded as the third word of the fourth sentence of the second paragraph of a document.

Figure 5E:
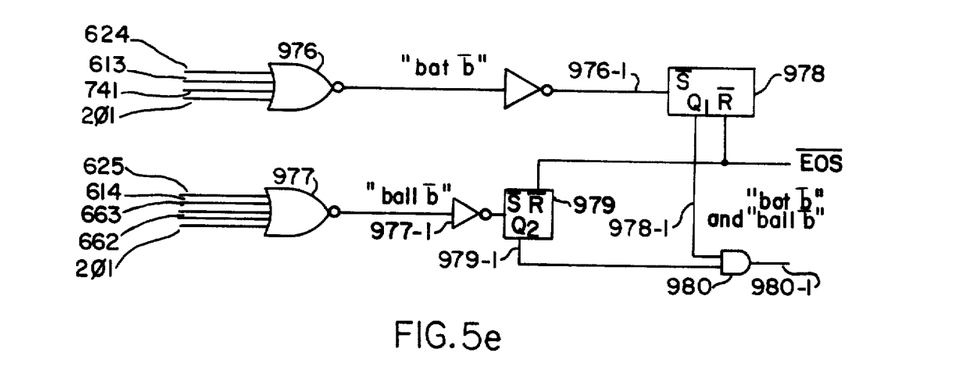

In accordance with this invention, full text searching is accomplished to locate documents in which a plurality of desired words occur within the same sentence. For example, one embodiment of a logical operator section 14 which may be utilized to locate text which includes the word "batb̄" and "ballb̄" in the same sentence is shown in FIG. 5e. NOR gate 976 has its input leads connected to leads 624, 613, 741 and 2∅1 of decoded data memory 13, thus providing a logical high output signal on lead 976-1 when the word "batb̄" has been decoded. Similarly, NOR gate 977 has its input leads connected to leads 625, 614, 6C3, 6C2 and 2∅1 of decoded data memory 13, thus providing a logical high on output lead 977-1 when the word "ballb̄" is decoded. Lead 976-1 is connected to the S̄ input of SR flip-flop 978, thus providing a logical high on the $Q_1$ output lead 978-1 when the word "batb̄" has been decoded. Similarly, lead 977-1 is connected to the S̄ input lead of SR flip-flop 979, thus providing a high signal on the $Q_2$ output lead 979-1 when the word "ballb̄" has been decoded. Flip-flops 978 and 979 are reset by a low $\overline{EOS}$ signal, which is applied to the $\overline{R}$ input leads of the flip-flops. Thus, at the end of each sentence, flip-flops 978 and 979 are reset ($Q_1$ and $Q_2$ reset to logical zero), thus indicating that the words "batb̄" and "ballb̄" have not been decoded within the next sentence. The output leads 978-1 and 979-1 from the flip-flops are connected to the input of AND gate 980, thus providing a logical high on output lead 980-1 when the words "batb̄" and "ballb̄" have been decoded within the same sentence (i.e. $Q_1$ output lead of flip flop 978 and $Q_2$ output lead of flip flop 979 both high). By utilizing the end of paragraph (EOP) or the end of document (EOD) signal in place of the end of sentence (EOS) signal in the logical operator section depicted in FIG. 5e, documents may be located in which the words "batb̄" and "ballb̄" are located within the same paragraph, or document, respectively.

It is often desired to find the location within the data base where a first desired word appears within a selected number of words of a second desired word. For example, it may be desirable to locate instances where the word "ball" appears within four words of the word "bat", in order to locate portions of the data base referring to baseball, while not locating portions of the data base referring to any other type of ball (e.g. golf ball, etc.) and any other type of bat (e.g. flying mammals). One embodiment of logical operator section 14 which may accomplish this task of locating portions of the data base wherein the word "bat" appears within four words of the word "ball" is shown in the schematic diagrams of FIGS. 7a and 7b.

Figures 7A, 7B:
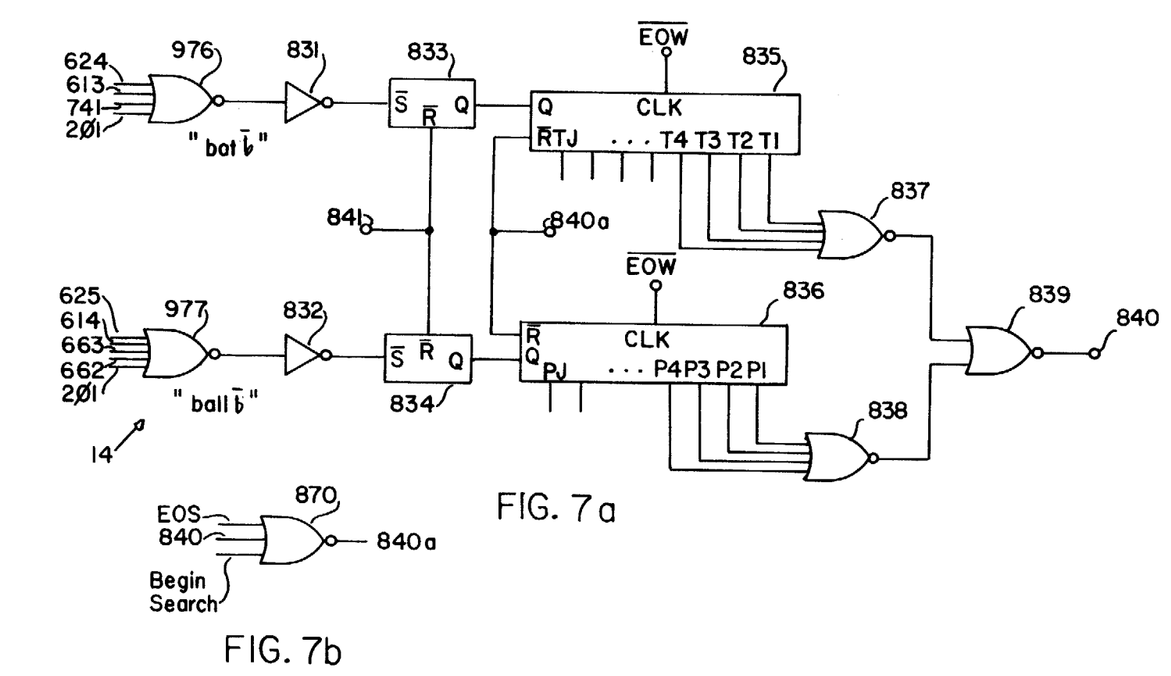
FIGS. 7a and 7b are diagrams of another embodiment of the logical operator section of this invention.

Logical operator section 14 of FIG. 7a includes NOR gate 976 and NOR gate 977, which are connected in the same manner as NOR gates 976 and 977, respectively, of FIG. 5e. Accordingly, a high output signal from NOR gate 976 indicates that the word "batb̄" has just been located. Similarly, a low output signal from NOR gate 977 indicates that the word "ballb̄" has just been located. Inverters 831 and 832 invert the output signal from NOR gates 976 and 977, respectively. Thus, upon detection of the word "batb̄38 the output signal from inverter 831 is low, thus setting SR flip flop 833 to have a high Q output signal. Similarly, upon detection of the word "ballb̄", the output signal from inverter 832 is low, thus setting SR flip flop 834 such that its Q output signal is high. The Q output signals from SR flip flops 833 and 834 are clocked into the least significant bit of shift registers 834 and 836, respectively, upon receipt of a low $\overline{EOS}$" signal which is applied to the clock input leads of shift registers 835 and 836. SR flip flops 833 and 834 are required in order to preserve the signal indicating that the desired words have been decoded, until the receipt of the $\overline{EOW}$ signal which clocks that data into shift registers 835 and 836, respectively. If SR flip flops 833 and 834 were not used, the signal indicating that the desired words had been detected would be lost prior to being clocked into shift registers 835 and 836, respectively. Of importance, when the $\overline{EOW}$ signal comprises a blank character (which appears at the end of every word), and the desired word being detected includes the blank character and the end of the word (e.g. "batb̄" and "ballb̄") shift registers 833 and 834 (and thus inverters 831 and 832) are not required, because the $\overline{EOW}$ signal appears simultaneously with the high output signal from either NOR gate 976 or NOR gate 977 indicating that the desired word has been decoded.

Upon detection of the word "batb̄" and receipt of the $\overline{EOW}$ signal, a logical one is clocked into the least significant bit of shift register 835. After the data from flip flops 833 and 834 have been clocked into shift registers 835 and 836, respectively, upon the receipt of an $\overline{EOW}$ signal, a low signal is applied to terminal 841 which is connected to the reset ($\overline{R}$) input leads of flip flops 833 and 834, thus resetting the Q output signals of flip flops 833 and 834 low. This reset signal applied to terminal 841 may comprise, for example, a signal $\overline{EOW'}$, which is derived from but delayed by approximately 75 microseconds from the $\overline{EOW}$ signal, thus resetting flip flops 833 and 834 after the data appearing on their Q output leads have been clocked into shift registers 835 and 836, respectively, upon receipt of a low $\overline{EOW}$ signal. At the beginning of a search, a logical low signal is applied in a well known manner to node 840a which is connected to the reset ($\overline{R}$) input leads of shift registers 835 and 836, thus resetting each bit within shift registers 835 and 836 to logical zeros. Upon each subsequent $\overline{EOW}$ signal, the data in shift registers 835 and 836 is shifted to the next most significant bit, with output data from SR flip flops 833 and 834 being input to the least significant bits of shift registers 835 and 836, respectively. Accordingly, the signals appearing on output leads T1 through Tj of shift register 835 indicate which one or ones of the previous j words decoded was equal to "bat$\overline{b}$", and the signals on the output leads P1 through Pj of shift register 836 indicates which one of the previous j words decoded was equal to "ball$\overline{b}$". In this example, it is desired to locate occurrences of the word "bat$\overline{b}$" within four words of the word "ball$\overline{b}$". Accordingly, the four least significant output leads of shift registers 835 and 836 are connected to the input leads of NOR gate 837 and 838, respectively. Thus, NOR gate 837 generates a low output signal when the word "bat$\overline{b}$" is one of the four most recently decoded words, and similarly, NOR gate 838 provides a low output signal when the word "ball$\overline{b}$" has been one of the four most recently decoded words. The output leads of NOR gates 837 and 838 are connected to the input leads of NOR gate 839, thus providing a high output signal from NOR gate 839 which is available on node 840 when both the words "bat$\overline{b}$" and "ball$\overline{b}$" have been decoded within four words of each other.

The shift registers 835 and 836 are reset in a number of desired ways. First, as previously described, on beginning a search, shift registers 835 and 836 are cleared. Shift registers 835 and 836 are also cleared upon receipt of a high output signal from NOR gate 839, thus indicating that the desired words have been decoded within four words of each other. This reset procedure is designed to prevent erroneous multiple high signals on the output lead of NOR gate 839 under certain circumstances when the desired words have been decoded. For example, if the desired words are adjacent to each other, and shift registers 834 and 836 are not reset upon their first detection, NOR gate 839 will provide a high output signal when the desired words are the two most recently decoded words, the second and third most recently decoded words, and the third and fourth most recently decoded words, thus providing three signals for the same occurrence of the two desired words. Thus, by resetting shift registers 835 and 836 upon receipt of a high output signal from NOR gate 839, such erroneous multiple signals will be prevented. Finally, shift registers 835 and 836 may, if desired, be reset upon receipt of an $\overline{EOS}$ signal, thus requiring the desired words to appear in the same sentence. Alternatively, shift registers 835 and 836 may be reset by the $\overline{EOP}$ signal or the $\overline{EOD}$ signal, thus requiring the desired words to be located within the same paragraph, or the same document, respectively.

FIG. 7b shows NOR gate 870 having its input leads connected to the EOS signal, the output signal from NOR gate 839 appearing on terminal 840, and a signal labelled as "begin search", which is high when a search is to begin. Accordingly, NOR gate 870 will provide a low output signal which is connected to terminate 840a of FIG. 7a to reset shift registers 835 and 836 at the beginning of each search, at the end of each sentence, and upon detection of the desired words and their desired relationship by receipt of a high signal on terminal 840.

Those of ordinary skill in the art, in light of the teachings of this invention, are also able to construct a logical operation section 14 may also be constructed which will detect the occurrence of a first desired word within a fixed number of sentences of a second desired word. Logical operator section 14 of FIG. 7a may be used for this purpose with but a few modifications. For example, shift registers 835 and 836 will, in this instance, receive their clock signals from the $\overline{EOS}$ signal, and flip flops 833 and 834 will be reset by a delayed $\overline{EOS'}$ signal applied to terminal 841. Furthermore, the NAND gate 870 of FIG. 7b will receive as its input signals the EOP signal in place of the EOS signal, if it is desired that the two words appear within the same paragraph. Alternatively, the EOS signal applied to NOR gate 870 of FIG. 7b is replaced by the EOD signal, when it is desired that the two desired words appear in the same document.

Furthermore, it is to be understood that the decoder 12 and decoded data memory 13 (FIG. 1) can be used with logical operator section 14 other than those specific embodiments provided in this specification. Similarly, the logical operator section 14 need not be used with the specific embodiments of decoder 12 and decoded data memory 13 provided in this specification.

The logical operator section 14 (FIG. 1) can comprise hardwired logical gates which serve to search for desired character strings. Alternatively, logical operator section 14 may comprise a large number of logical gates, including AND gates, OR gates, NOR gates, flip-flops, and the like, which may be programmably connected in order to provide the desired character search, in order to be highly flexible in performing searches. The use of cross-point switch arrays, and particularly such arrays implemented as integrated circuits, will be useful in the construction of logical operator section 14. One such 256 by 256 cross-point switching array is described in an article entitled "Cross-Point Array IC Handles 256 Voice and Data Channels", written by Lloyd Reaume and appearing in Electronics Magazine, Oct. 6, 1981, pages 133–135. Such a cross-point switch array is useful for connecting the plurality of output leads from the shift registers of decoded data memory 13 contained within bus 13a, the EOW, EOS, EOP, and EOD signals, as well as providing interconnections between the logical gates of logical operators section 14. Utilizing a suitable computer program, the operation of such cross-point switch arrays within logical operators section 14 may be accomplished as a result of simple commands describing the desired search. The computer is programmed to receive the commands and operate the cross-point switch array in such a manner as to provide proper connection between the leads within bus 13a, the EOW, EOS, EOP and EOD leads, and the logical gates within logical operator section 14.

As previously described, upon the decoding of the desired character string, logical operator section 14 generates a signal on bus 14a, which is connected to central processing unit (CPU) 15 (FIG. 1). CPU 15 then operates as programmed, for example, to store the document number containing the desired character string, print the sentence containing the desired character string, and the like.

While this specification has explained the operation of this invention in conjunction with several specific embodiments, it is to be understood that this specification is not to operate as a limitation on the scope of the invention. Many other embodiments of this invention will become apparent to those skilled in the art in light of the teachings of this invention.

I claim:

1. A textual comparison system for locating desired character strings within textual material formed from a predefined sequence of characters comprising:

means for sequentially receiving a plurality of stored textual characters;

means for sequentially decoding said plurality of stored textual characters, thereby providing a sequence of decoded characters, said means for decoding said stored textual characters having a plurality of N output leads, where N is an integer equal to the number of unique textual characters which are to be decoded; each said N output leads being uniquely associated with one of said textual characters to be decoded, where the unique one of said N output leads associated with the specific character being decoded provides a signal when the textual character associated with said output lead has been decoded;

means for storing said decoded characters and information as to the relative positioning of said decoded characters within said predefined sequence of characters;

means for comparing said decoded characters and said information as to the relative positioning of said decoded characters with information defining said desired character strings, whereby the presence of desired character strings is determined; and means for providing a signal indicating that a desired character string has been located.

2. Structure as in claim 1 wherein said means for storing said decoded characters and information as to the relative positioning of said decoded characters comprises a plurality of N shift registers, where N is an integer equal to the number of unique textual characters which are to be decoded, and where each of said plurality of N shift registers is associated with a unique one of said N textual characters.

3. Structures as in claim 2 wherein each of said N shift registers receives as an input data signal the signal on the output lead of said decoder means associated with the unique textual character associated with said shift register.

4. Structure as in claim 3 wherein each of said shift registers is clocked once upon the decoding of each character which is decoded by said decoder means.

5. Structure as in claim 4, wherein each of said shift registers is capable of storing a plurality of K bits, where K is a positive integer, and the data stored within said N shift registers indicates which textual characters have been decoded and the relative position of said textual characters within said textual material.

6. Structure as in claims 1, 2, 3, 4 or 5 wherein said textual characters are stored in ASCII and N is equal to 96.

7. Structure as in claim 5 wherein said means for comparing comprises a plurality of logical gates, each said logical gate corresponding to one character string to be decoded and wherein each said logical gate comprises:

a plurality of K input leads corresponding to an equal plurality of K characters comprising a desired character string, said input lead corresponding to the kth character (where kth is an integer given by $1 \leq / \leq K$) from the end of said desired character string being connected to the kth least significant bit of said shift register associated with said kth character.

8. Structure as in claim 7 wherein said signal on each of said output leads of said decoder means is a logical zero only when said character associated with said output lead has been decoded.

9. Structure as in claim 8 wherein said logical gate comprises a NOR gate and the output signal from said NOR gate is a logical one when said desired character string has been located.

10. Structure as in claim 7 which further includes a plurality of J (where J is a positive integer less than or equal to K) latches for storing information as to whether an associated one of J character strings has been located.

11. Structure as in claim 10 which further includes a logical gate having input leads connected to the output leads of said latches, thereby providing an output signal indicating whether all of said J character strings have been located.

12. Structure as in claim 11 wherein said latches are reset at the beginning of each document, thereby causing said logical gate to provide an output signal indicating whether all of said J character strings have been located within the same document.

13. Structure as in claim 11 wherein said latches are reset at the beginning of each paragraph, thereby causing said logical gate to provide an output signal indicating whether all of said J character strings have been located within the same paragraph.

14. Structure as in claim 11 wherein said latches are reset at the beginning of each sentence, thereby causing said logical gate to provide an output signal indicating whether all of said J character strings have been located within the same sentence.

* * * * *